United States Patent Office 3,761,350
Patented Sept. 25, 1973

3,761,350
THERMOSETTING WET STRENGTH RESIN
Francis S. Munjat, Philadelphia, and Sin-Ho Kim, Haverford, Pa., assignors to E. F. Houghton & Co., Philadelphia, Pa.
No Drawing. Filed June 23, 1971, Ser. No. 156,127
Int. Cl. D21d 3/00
U.S. Cl. 162—164
14 Claims

ABSTRACT OF THE DISCLOSURE

Cationic thermosetting resins useful in imparting wet strength to paper are prepared by reacting a heterocyclic dicarboxylic acid of the formula

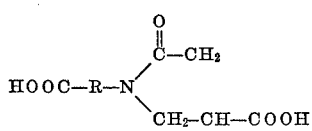

where R is alkylene or arylene with a diamine or polyalkylene polyamine, and epichlorohydrin to form a water-soluble polyamine polyamide polymer, and then, reacting the said polymer with further epichlorohydrin. An amino carbonyl compound may be included as a fourth reactant in forming the water-soluble polyamine polyamide polymer.

---

During the past two decades, a large number of different resins have been proposed for use in providing paper with improved wet strength. The greater portion of such resins have been various types of polyamides rendered thermosetting by means of crosslinking agents such as halohydrins. An advantage of these resins resides in the fact that they are pH independent, and thus can be applied to paper stock under alkaline, neutral, or acid conditions.

An important property of any wet strength resin is the ability to provide paper with sufficient wet strength "off the machine," i.e., simply dried as it emerges from the wet end of a typical Fourdrinier paper machine and rolled up. Aging at room temperature allows additional curing of the resin and provides increased wet strength. Accelerated cure may be effected in systems which contain suitable drying sections.

Many of the various wet strength resins disclosed in the patent art provide inadequate off the machine wet strength, and in many instances insufficient wet strength after cure.

Those resins which give adequate wet strength properties with economically feasible amounts of resin generally do not provide adequate dry strength improvement to the paper. This latter property is also of importance to the paper maker.

In accordance with this invention, there are provided novel cationic thermosetting resins which provide paper with excellent wet strength, both off the machine and cured and also provide additional dry strength to the paper.

It was discovered that resins for providing paper with improved wet strength and additional dry strength can be produced using specific types of reactants, including certain heterocyclic dicarboxylic acids, in specified proportions to obtain a water soluble polyamine polyamide polymer which is rendered cross-linkable by means of epichlorohydrin.

More particularly, the cationic thermosetting resins of this invention are prepared by reacting:

(a) a heterocyclic dicarboxylic acid of the formula

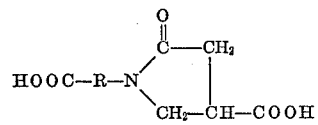

where R is an alkylene radical containing from 1 to 10 carbon atoms or an arylene radical, and for each mole of dicarboxylic acid, (b) from 0 to 5 moles of an amino carbonyl compound which is an amino acid of the formula $$H_2N\text{---}R'\text{---}COOH \qquad (II)$$

or a lactam of the formula

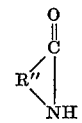 (III)

where R' is an alkylene radical containing from 1 to 10 carbon atoms or an arylene radical and R'' is an alkylene radical containing from 3 to 10 carbon atoms;

(c) from 1 to 4 moles of an amine which is a diamine of the formula $$H_2N\text{---}R'''\text{---}NH_2 \qquad (IV)$$

or a polyalkylene polyamine of the formula $$H_2N\text{---}(R^{iv}\text{---}NH)_n\text{---}H \qquad (V)$$

where $R'''$ and $R^{iv}$ are alkylene groups containing from 2 to 6 carbon atoms, and $n$ is an integer from 1 to 5; and (d) from 1 to 3 moles of epichlorohydrin, to form a water soluble polyamine polyamide, polymer, and then further reacting said polymer with epichlorodrin to produce a thermosetting resin.

A preferred resin is obtained by reacting 1-(carboxypentyl), 4-carboxypyrrolidone, caprolactam, diethylene triamine, and epichlorohydrin to form the water soluble polyamine polyamide polymer which is subsequently rendered cross-linkable by reaction with additional epichlorohydrin.

Of particular importance in providing the novel improved wet strength and dry strength resins of this invention is the use of certain heterocyclic dicarboxylic acids having the structure of Formula I, above. These dicarboxylic acids may be prepared by reacting itaconic acid with an amino acid of Formula II or a lactam of Formula III in substantially equimolar proportions. The reaction may be carried out in aqueous solution; however, the amount of water used should be adjusted to provide suitable reaction conditions to produce the product desired. Thus, although the aqueous solution of reactants may contain up to about 50% by weight of water, subsequent concentration by distillation may reduce the reaction solution to 5 to 10% of water. The reactants are merely mixed with water in the stated proportions, solubilized by heating to 105° to about 130° C. for a period of from about 2 to 5 hours. In the case of the amino acids, concentration of the reacting solution can begin immediately after solubilization; with lactams, sufficient time must be given to accomplish hydrolysis to amino acid. Initially, there is formed an intermediate tricarboxylic acid by addition of the itaconic acid methylene double bond to the amino group of the amino acid. The solution need now only to be concentrated to form the heterocyclic dicarboxylic acid.

The reaction mechanism involved in forming one of the preferred heterocyclic dicarboxylic acids, namely, 1-(p-carboxyphenyl), 4-carboxypyrrolidone, may be illustrated by the following equations wherein itaconic acid and p-amino-benzoic acid are the reactants. The dicarboxylic acid separates from the reaction media and is isolated as a crystalline material.

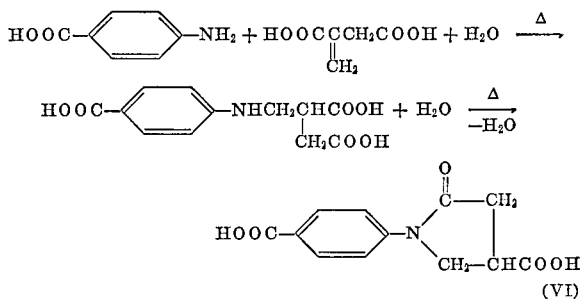

(VI)

This heterocyclic dicarboxylic acid is identified by melting point (277–287° C.), acid number (435), and an analysis of significant bands in an infrared spectrum.

This same reaction procedure utilizing aliphatic amino acids results in highly viscous solutions of the dicarboxylic acid at room temperature.

The same amino carbonyl compounds employed in forming the heterocyclic dicarboxylic acid may also be used in forming the water soluble polyamine polyamide polymer. However, in any particular polymer, the same or a different amino carbonyl compound may be used in forming the polymer as was employed in forming the heterocyclic acid.

As noted, the amino acids which may be used have the formula

where R' is an alkylene radical containing from 1 to 10 carbon atoms or an arylene radical. The alkylene radical may be a straight or branched chain aliphatic group. Preferably, where R' is an alkylene radical, the amino acids are alpha-substituted amino acids such as alanine, leucine, valine, and alpha-amino butyric acid. Other suitable amino acids include glycine, beta-alanine, 4-amino butyric acid, 6-amino-caproic acid, and 11-amino undecanoic acid.

Aromatic amino acids which have been found useful in preparing the novel cationic thermosetting resins of the invention may contain such radicals as phenylene, naphthylene, etc., and alkyl substituted forms thereof. The amino group may be directly substituted on the aromatic nucleus, or it may be on a terminal carbon atom of an alkyl group of 1 to 7 carbon atoms substituted on the aromatic ring. Similarly, the carboxylic acid group may be directly substituted on the aromatic ring or on a terminal carbon atom of an alkyl group containing from 1 to 7 carbon atoms substituted on the aromatic ring. Water solubility of the final resin characterizes the useful amino and carboxyl group containing compounds. Typical of useful aromatic amino carboxylic acids are o, m, and p-amino benzoic acid, p-(2-amino-ethyl) benzoic acid and p-aminophenylacetic acid.

Lactams which are suitable for use in preparing the resins of this invention have the formula

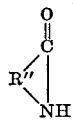

where R" is an alkylene radical containing from 3 to 10 carbon atoms. Thus, useful lactams include pyrrolidone, e-caprolactam and the like, the latter lactam being particularly preferred.

In addition to the heterocyclic dicarboxylic acid and amino carbonyl compound, certain amines are also employed in combination therewith in preparing the water soluble polyamine polyamide polymers. As stated above, the amines may be certain alkylene diamines of Formula IV or certain polyalkylene polyamines of Formula V.

In the diamines, the primary amine groups are separated by an alkylene radical containing from 2 to 6 carbon atoms. Thus, suitable diamines include ethylene, propylene, butylene, pentylene, and hexylene diamine. Ethylene and propylene diamine are particularly preferred diamines inasmuch as they are somewhat more economical than the higher diamines.

A variety of polyalkylene polyamines including polyethylene polyamines, polypropylene polyamines, polybutylene polyamines, and the like can be employed to produce the polyamide, of which the polyethylenepolyamines represent an economically preferred class. More specifically, the polyalkylene polyamines employed are polyamines containing two primary amine groups, and at least one secondary amine group in which the nitrogen atoms are linked together by alkylene groups containing from 2 to 6 carbon atoms. The nitrogen atoms may be attached to adjacent carbon atoms in the ethylene groups or to carbon atoms further apart, but not to the same carbon atom. Polyamines such as diethylenetriamine, triethylenetetramine, tetraethylenepentamine, dipropylenetriamine, and the like, which can be obtained in reasonably pure form can be used as well as mixtures thereof and mixtures of various crude polyamine materials. For example, the mixture of polyethylenepolyamines obtained by the reaction of ammonia and ethylenedichlorides, refined only to the extent of removal of chlorides, water, and excess ammonia, can be employed in the reaction with the dicarboxylic acid.

Most preferred are the polyethylene polyamines containing from two to four ethylene groups, two primary amine groups, and from one to three secondary amine groups.

The term, "polyalkylene polyamine," employed in this specification and the claims, therefor, refers to and includes any of the polyalkylene polyamines referred to above and to mixtures thereof.

Rather than using solely a diamine or a polyalkylene polyamine, mixtures of the two types of amines, e.g., a mixture of ethylenediamine and diethylenetriamine may also be used.

The remaining reactant in producing the water soluble polyamine polyamide polymers is epichlorohydrin. This reactant functions to tie together the condensation products of the other reactants, namely, heterocyclic dicarboxylic acid, amino carbonyl compound, if present, and amine. In addition, it produces additional secondary amine groups by reaction with primary amines. These secondary amine groups become reaction sites for additional epichlorohydrin by which the polymer is rendered cationic and also thermosetting.

The proportions of the reactant described above in providing the improved resins is quite important. It was found that the mole ratios of reactants: (a) heterocyclic dicarboxylic acid, (b) amino carbonyl compound, (c) diamine or polyalkylene polyamine, and (d) epichlorohydrin employed in providing the water soluble polyamine polyamide polymer should be:

(b) to (a)—from about 0:1 to about 5:1
(c) to (a)—from about 2:1 to about 4:1
(d) to (a)—from about 1:1 to about 3:1

Preferred mole ratios of the four reactants in obtaining resins of optimum wet strength (uncured and after cure) are (b) to (a) about 1:1, (c) to (a) about 2:1, and (d) to (a) about 1:1.

A preferred process by which the water soluble polyamine polyamide polymer may be prepared from the above-defined reactants comprises first mixing together in a suitable reactor the heretocyclic dicarboxylic acid, the amino carbonyl compound, if any, and the amine and heating the mixture at a temperature of from about 135° C. to about 165° C. under reflux conditions for a period of from about 30 to 60 minutes.

During such heating, the components react to form low molecular weight prepolymers. A low molecular weight unit obtained when using 1(carboxypentyl),- 4 - carboxy pyrrolidone, caprolactam, and diethylenetriamine as the reactants is as follows:

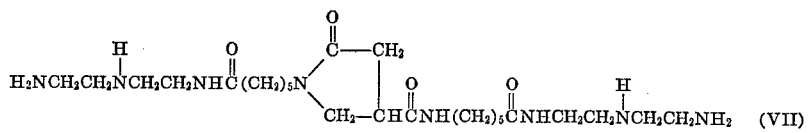

A mole of water is added to this mixture, and the whole is cooled to a temperature of from about 80 to 90° C., and epichlorohydrin is then added slowly. After addition of all the epichlorohydrin, the mixture is again heated to a temperature from about 165° C. to 215° C., the water of condensation being removed during heating. The epichlorohydrin reacts with available primary amine groups and, in so doing, links together the prepolymers to form the water-soluble polyamino polyamide polymer. In addition, the reaction between the epichlorohydrin and the primary amine groups produces secondary amine groups which are available for reaction in the crosslinking reaction with epichlorohydrin.

A storage-stable solution of the polyamine polyamide polymer can be obtained by adding sufficient water to the polymer to provide a solution containing from about 35 to 75% solids.

The polymer contains the following repeating units—

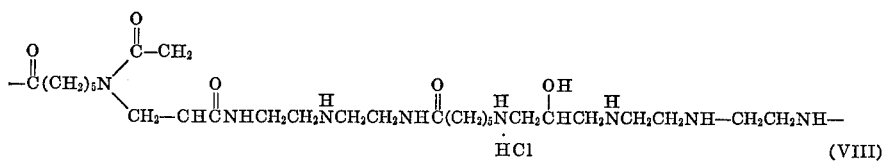

or

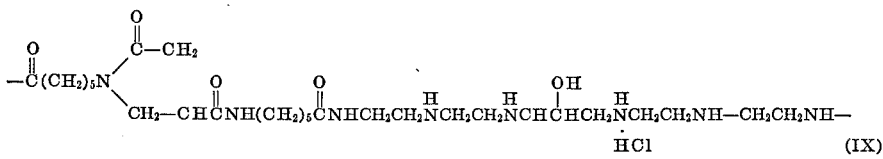

In order to render the water-soluble polyamine polyamide polymer crosslinkable or thermosetting, the polymer is reacted with additional epichlorhydrin. In carrying out this reaction, the polymer solution is first further diluted with water to provide a polymer solution containing from about 18 to 25% solids. While maintaining this solution at a temperature of from about 40 to about 60° C., epichlorohydrin is added incrementally, e.g. dropwise. After addition of all the epichlorohydrin, the solution is heated to a temperature of from about 70 to 80° C. until a viscosity greater than I on the Gardner-Holdt scale is obtained. The reaction mixture is then diluted and acidified with acid to give a final solution containing 10% solids and having a pH of about 5. The Gardner-Holdt viscosity is A to B.

Generally, from about 0.5 to about 1.8 moles of epichlorohydrin per secondary amine group should be used in rendering the polymer thermosetting. The preferred amount of epichlorohydrin used for such purpose is about one mole for each secondary amine group.

An alternate procedure for forming the water-soluble polyamine polyamide polymer is to combine initially all of the reactants in a suitable reactor, together with about one mole of water per mole of heterocyclic dicarboxylic acid. During addition of the several reactants, the temperature of the reaction solution is maintained below about 110° C. by cooling. The mixture is then heated to a temperature from about 165° C. to about 215° C., generally for a period of about 3 to 5 hours, while continuously removing water from the reaction mixture. After the condensation, the resulting polyamine polyamide polymer is further treated as described above.

An idealized formula for a preferred water-soluble polyamine polyamide polymer according to this invention is as follows:

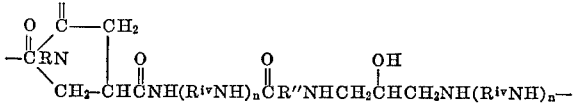

where R and R″ are pentylene, $R^{iv}$ is ethylene and $n$ is 2.

The cationic thermosetting resins of this invention impart improved wet and dry strength to paper (uncured or cured) whether made under acid, alkaline, or neutral conditions.

The resin preferably is incorporated into paper pulp at any point on the wet end of the paper machine e.g. at the beater, stock chest, head box, etc. The resin may also be applied to a web of paper as by immersing the web in a solution of the resin, by spraying, etc., followed by heating to cure the resin. For most purposes, adequate wet strength is developed by simply drying the sheet and allowing natural aging to take place.

Adequate wet strength may be obtained by incorporating in the paper from about .15% to about 3% of the resin based on the dry weight of the pulp. Higher percentage additions may be made for special purposes.

Paper and pulp slurries having a pH of from 4.5 to 11 may be effectively treated with resins of this invention.

The invention will be illustrated by means of the following examples:

Example 1

130 g. itaconic acid, 300 g. water, and 137 g. p-aminobenzoic acid (tech.) were charged into a one liter flask equipped with a condenser, thermometer, and stirrer. The reaction mixture was heated to reflux and concentrated to one third the volume of water. The solid heterocyclic dicarboxylic acid begins to precipitate from solution. This acid has a melting point of 279–288° C. and an acid number of 435 (theory 452).

The mixture was cooled and 206 g. diethylenetriamine and 113 g. caprolactam were added. The temperature was held below 105° C. during the addition. After solution of the materials, the reaction mixture was further cooled to 40° C. where 92.5 g. epichlorohydrin were added incrementally controlling the exotherm to 110° C. with cooling. After all the epichlorohydrin was added, the whole was heated to 190–195° C. for one-half hour. The polyamine polyamide polymer was diluted to 50% polymer solids with 570 g. water. The Gardner-Holdt viscosity of this solution was E.

The polyamine polyamide polymer comprised one mole of dicarboxylic acid, one mole of amino acid, two moles of amine, and one mole of epichlorohydrin. Amine equivalent based on secondary amine—147.0 (includes secondary amine hydrochloride).

73.5 g. of the above polymer solution were diluted with 38.2 g. water and heated to 55° C. 23.1 g. of epichlorohydrin were added dropwise over a period of 13 minutes. The temperature was allowed to rise to 65° C. The mixture was then heated to 80° C. until the Gardner-Holdt viscosity was greater than I. The polymer was then diluted with 476 g. water to 10% solids and acidified to pH 5.2 with sulfuric acid. The Gardner-Holdt viscosity of the 10% solution was less than A. The ratio of epichlorohydrin to secondary amine was 1:1.

EXAMPLE 2

A polyamine polyamide polymer was prepared from 90.5 g. itaconic acid, 91 g. 6-amino hexanoic acid, 12.5 g. water, 143 g. diethylene triamine, and 64.3 g. epichlorohydrin. The procedure in Example 1 was essentially followed except that as a time saving device, formation of the heterocyclic dicarboxylic acid was carried out in concentrated solution. The resulting acid was an extremely thick solution with an acid number of 390 (theory 400). The resulting polyamino polyamide polymer solution contained 50% active solids and had a viscosity of T+ on the Gardner-Holdt scale.

The polyamine polyamide polymer comprised one mole of dicarboxylic acid, two moles of amine and one mole epichlorohydrin. Amine equivalent based on secondary amine—117.0 (includes secondary amine hydrochloride).

78 g. of the above solution were diluted with 102 g. water and heated to 55° C. 20.4 g. epichlorohydrin were added over 11 minutes with an exotherm to 61° C. The mixture was heated at 70° C. until a Gardner-Holdt viscosity greater than I was obtained. 394 g. water were added, and the pH adjusted to 5.1 with sulfuric acid. The viscosity of the 10% product was A+. The ratio of epichlorohydrin to secondary amine was 0.67:1.

EXAMPLE 3

A polyamino polyamide polymer was prepared from 65.5 g. 6-aminohexanoic acid, 65 g. itaconic acid, 25 g. water, 103 g. diethylenetriamine, 56.5 g. caprolactam, and 46.25 g. epichlorohydrin according to the procedure of Example 2. The resulting polyamino polyamide solution had a concentration of 50% active solids and a Gardner-Holdt viscosity of K.

The polymer comprised one mole of dicarboxylic acid, one mole of lactam, two moles of amine and one mole epichlorohydrin. Amine equivalent based on secondary amine—145.5 (includes secondary amine hydrochloride).

78 g. of the above solution were diluted with 91 g. water and heated to 50° C. 23.1 g. epichlorohydrin were added over 8 minutes with the exotherm rising to 56° C. The mixture was heated at 70° C. until a Gardner-Holdt viscosity greater than I was obtained. 429 g. water were added to make 10% active solids. The pH was adjusted to 5.1 with sulfuric acid. The ratio of epichlorohydrin to secondary amine was 0.94:1 for the 10% product. The Gardner-Holdt viscosity was A.

EXAMPLE 4

A polyamino polyamide polymer solution was made from 65.5 g. 6-aminohexanoic acid, 65 g. itaconic acid, 25 g. water, 66 g. ethylene diamine (90%), 56.5 g. caprolactam, and 46.25 g. epichlorohydrin according to the procedure in Example 2. The resulting resin solution was 50% active solids and had a Gardner-Holdt viscosity of G.

62 g. of the above solution were diluted with 62 g. water and heated to 55° C. 11.6 g. epichlorohydrin were added over 20 minutes at 55° C. The mixture was heated to 78° C. and held at this temperature until a Gardner-Holdt viscosity greater than I was reached. 390 g. water were added to make 10% active solids, the pH was adjusted to 5.4 with hydrochloric acid. The Gardner-Holdt viscosity of the 10% product was less than A. The epichlorohydrin ratio per secondary amine was 1:1 for the 10% product.

The polymer comprised one mole of dicarboxylic acid, one mole of lactam, two moles of amine, and one mole of epichlorohydrin. Amine equivalent based on secondary amine—248 (includes secondary amine hydrochloride).

EXAMPLE 5

A polyamino polyamide polymer was prepared by refluxing 165 g. caprolactam, 190 g. itaconic acid, and 30 g. water for three hours. Cooling this solution resulted in a thick viscous syrup. 165 g. of additional caprolactam were added, and then 300 g. of diethylene triamine were added dropwise allowing the exothem to rise to 121° C. This solution was again refluxed for 1½ hours, cooled to 65° C., and 30 g. of water were added. 135 g. epichlorohydrin were added incrementally allowing the exotherm to rise to 115° C. The solution was heated to 155° C. and water removed from the reaction. Vacuum was applied for two hours to drive the reaction to completion. 795 g. water (including the distillate) were added to make a 50% active polymer solution. The Gardner-Holdt viscosity of this product was U.

330 g. of the above solution were added to a three liter flask equipped with thermometer, condenser, and stirrer. 770 g. water were added, and the solution was heated to 52° C. 105 g. epichlorohydrin were added over 30 minutes, and the mixture was then heated at 70° C. until a Gardner-Holdt viscosity greater than I was attained. The product was diluted to 10% solids with 900 g. water; the pH adjusted to 5.1 with sulfuric acid. The final viscosity of the product on the Gardner-Holdt scale was A. The ratio of epichlorohydrin to secondary amine was 1:1 for the 10% product.

The polymer comprised one mole of dicarboxylic acid, one mole of lactam, two moles of amino and one mol epichlorohydrin. Amine equivalent based on secondary amine—145.5 (includes secondary amine hydrochloride).

EXAMPLE 6

A polyamino polyamide resin was prepared from 65.5 g. 6-aminohexanoic acid, 65 g. itaconic acid, 25 g. water, 154.5 g. diethylene triamine, 282.5 g. caprolactam and 69.2 g. epichlorohydrin using the procedure of Example 2. The viscosity of the 50% polymer was J on the Gardner-Holdt scale.

The polymer comprised one mole of dicarboxylic acid, five moles of lactam, three moles of amine and 1.5 moles epichlorohydrin. Amine equivalent based on secondary amine—195 (includes secondary amine hydrochloride).

51.8 g. of the above solution and 44 g. water were heated to 55° C. and 11.2 g. epichlorohydrin were added dropwise over 15 minutes with the exotherm rising to 57° C. The mixture was heated at 70° C. until a Gardner-Holdt viscosity greater than I was obtained. The polymer solution was diluted to 10% active solids with 264 g. water and the pH adjusted to 5 with sulfuric acid. The final viscosity was less than A on the Gardner-Holdt scale. The epichlorohydrin ratio per secondary amine was 0.84:1.

EXAMPLE 7

A polyamino polyamide polymer was prepared from 103 g. 4-amino butyric acid, 130 g. itaconic acid, 25 g. water, 206 g. diethylene triamine, 113 g. caprolactam and 92.5 g. epichlorohydrin according to the procedure in Example 2. The resulting polymer solution had a viscosity of F+ on the Gardner-Holdt scale.

The polymer comprised one mole of dicarboxylic acid, one mole of lactam, two moles of amine and one mole epichlorohydrin. Amine equivalent based on secondary amino—138.5 (includes secondary amine hydrochloride).

58 g. of the above polymer solution were diluted with 81 g. water and heated to 55° C. 23.1 g. epichlorohydrin were added dropwise over 8 minutes with an exotherm proceeding to 68° C. This mixture was heated at 70° C. until a viscosity greater than I on the Gardner-Holdt scale was reached. 415 g. water were added to bring the product to 10% active solids. The pH was adjusted to 5.2 with sulfuric acid. The ratio of epichlorohydrin to secondary amine was 1.2:1 in the 10% product.

Table I below sets forth the wet tensile strength provided by the polymers of the above examples, off the machine and cured.

TABLE I

Pulp—bleached sulfite
Basis weight—20 lb. sheet
Resin—1% add on pH—7-0
Off machine (dried)—4 minutes at 105° C.
Cured—1 hour at 105° C.

| Example | Wet tensile strength | |
| --- | --- | --- |
| | Off machine | Cured |
| Blank | 3.2 | 3.8 |
| 1 | 18.1 | 32.2 |
| 2 | 23.5 | 25.3 |
| 3 | 23.3 | 41.9 |
| 4 | 18.6 | 25.5 |
| 5 | 23.8 | 39.3 |
| 6 | 22.4 | 36.2 |
| 7 | 22.5 | 38.0 |

Set forth in Table II are the dry tensile strengths provided by the polymers of the several examples when applied to bleached sulfite pulp as described in Table I.

TABLE II

Dry tensile strength (oz./in.)

| | |
| --- | --- |
| Blank | 148.5 |
| 1 | 165.0 |
| 2 | 151.7 |
| 3 | 156.7 |
| 4 | 148.5 |
| 5 | 157.0 |
| 6 | 150.1 |
| 7 | 154.7 |

TABLE III

Table III sets forth tensile strength data for the polymer of Example 5 when applied to sulfite pulp as set forth in Table I at a pH of 5, 7 and 9.

| | Tensile strength (oz./in.) | | | |
| --- | --- | --- | --- | --- |
| | Wet strength | | Dry strength | |
| pH | Off machine | Cured | Off machine | Cured |
| 5 | 26.3 | 43.7 | 157 | 150 |
| 7 | 28.5 | 48.0 | 161.5 | 157 |
| 9 | 30.8 | 48.7 | 172 | 172 |

Table IV shows the effect of polymer concentration (Example 5 polymer), on wet strength.

TABLE IV

Pulp—secondary fiber (50% cupstock, 50% ledger)
Basis weight—40 lb. sheet
Resin—variable add on pH—7
Off machine (dried)—4 minutes at 105° C.
Cured—1 hour at 105° C.

| | Wet tensile strength (oz./in.) | |
| --- | --- | --- |
| Add-on percent | Off machine dried | Cured |
| 0.00 | 7.2 | 10.2 |
| 0.25 | 10.0 | 14.9 |
| 0.50 | 14.4 | 22.5 |
| 1.00 | 16.1 | 34.8 |
| 2.00 | 31.4 | 45.9 |
| 3.00 | 34.5 | 49.7 |
| 4.00 | 35.4 | 59.7 |
| 5.00 | 36.6 | 80.1 |

What is claimed is:

1. A cationic thermosetting resin prepared by reacting:
   (a) a heterocyclic dicarboxylic acid of the formula

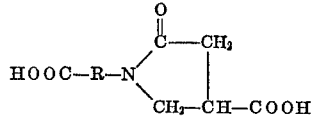

where R is an alkylene radical containing from 1 to 10 carbon atoms or an arylene radical, and for each mole of said dicarboxylic acid
   (b) from 0 to 5 moles of an amino carbonyl compound which is an amino acid of the formula $$H_2N—R'—COOH$$

or a lactam of the formula

where R' is an alkylene radical containing from 1 to 10 carbon atoms or an arylene radical, and R'' is an alkylene radical containing from 3 to 10 carbon atoms or an arylene radical, and R'' is an alkylene radical containing from 3 to 10 carbon atoms;
   (c) from 1 to 4 moles of an amine which is a diamine of the formula $$H_2N—R'''—NH_2$$

or a polyalkylene polyamine of the formula $$H_2N—(R^{iv}NH)_n—H$$

where $R'''$ and $R^{iv}$ are alkylene groups containing from 2 to 6 carbon atoms, and $n$ is an integer from 1 to 5; and
   (d) from 1 to 3 moles of epichlorohydrin,
to form a water-soluble polyamine polyamide polymer, and further reacting said polymer with epichlorohydrin.

2. A cationic thermosetting resin according to claim 1 in which the mol ratio of the further reacted epichlorohydrin to secondary amine groups in said polymer is from about 0.5 to 1 to about 1.8 to 1.

3. A cationic thermosetting resin according to claim 2 in which one mole of each of reactants (b) and (d) and two moles of reactant (c) for each mol of reactant (a) are used, and sufficient additional epichlorohydrin is used to convert all of the secondary amino groups of said polymer to tertiary amino groups.

4. A cationic thermosetting resin according to claim 3 wherein said reactant (a) is 1-(carboxypentyl), 4-carboxypyrrolidone, reactant (b) is caprolactam, and reactant (c) is diethylene triamine.

5. A process for producing a cationic thermosetting resin which comprises heating to about a temperature of from about 135° to about 165° C. under reflux conditions a mixture of:
   (a) a heterocyclic dibasic carboxylic acid of the formula

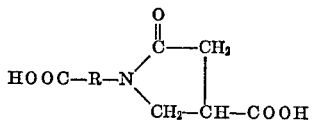

where R is an alkylene radical containing from 1 to 10 carbon atoms or an arylene radical, and for each mole of said dicarboxylic acid, (b) from about 0 to about 5 moles of an amino carbonyl compound which is an amino acid of the formula

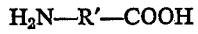

or a lactam of the formula

where R' is an alkylene radical containing from 1 to 10 carbon atoms or an arylene radical, and R" is an alkylene radical containing from 3 to 10 carbon atoms, and (c) from about 1 to 4 moles of an amine which is a diamine of the formula

or a polyalkylene polyamine of the formula

where R''' and R$^{iv}$ are alkylene groups containing from 2 to 6 carbon atoms, and $n$ is an integer from 1 to 5, cooling the reaction mixture to a temperature of from about 80° to about 90° C., adding (d) epichlorohydrin, and heating the resulting mixture at a temperature of from about 165° to about 215° C. while removing water of condensation to form a water-soluble polyamine polyamide polymer; adding sufficient water to provide a solution containing from about 18 to about 25% by weight of polymer, adding from about 0.5 to about 1.8 moles of epichlorohydrin per secondary amine group in said polymer while maintaining said polymer solution at a temperature of from about 40 to about 60° C., heating said solution to a temperature of from about 70° to 80° C. until a viscosity greater than I on the Gardner-Holdt scale is obtained.

6. The process according to claim 5 in which 1 mole of each of reactants (b) and (d) and two moles of reactant (c) for each mole of reactant (a) are used in forming the polymer, and the reaction between said polymer and epichlorohydrin is continued until a viscosity greater than I on the Gardner-Holdt scale is obtained.

7. The process according to claim 6, wherein reactant (a) is 1-(carboxypentyl), 4-carboxypyrrolidone, reactant (b) is caprolactam, and reactant (c) is diethylene triamine.

8. A process for producing a cationic thermosetting resin which comprises forming an aqueous mixture of (a) a heterocyclic dibasic carboxylic acid of the formula

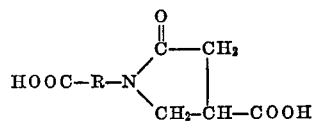

where R is an alkylene radical containing from 1 to 10 carbon atoms or an arylene radical, and for each mole of said dicarboxylic acid, (b) from about 0 to 5 moles of an amino carbonyl compound which is an amino acid of the formula

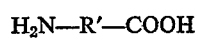

or a lactam of the formula

where R' is an alkylene radical containing from 1 to 10 carbon atoms or an arylene radical, and R" is an alkylene radical containing from 3 to 10 carbon atoms, and (c) from about 1 to about 4 moles of an amine which is a diamine of the formula

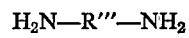

or a polyalkylene polyamine of the formula

where R''' and R$^{iv}$ are alkylene groups containing from 2 to 6 carbon atoms, and $n$ is an integer from 1 to 5, and (d) from about 1 to about 3 moles of epichlorohydrin, said mixture containing about one mole of water for each mole of reactant (a); heating said mixture to a temperature from about 165° to about 215° C. while removing water to form a water-soluble polyamine polyamide polymer; adding sufficient water to provide a solution containing from about 15 to about 25% by weight of polymer, adding from about 0.5 to about 1.8 moles of epichlorohydrin per secondary amine group in said polymer while maintaining said polymer solution at a temperature of from about 40 to about 60° C., and heating said solution to a temperature of from about 70° to about 80° C. until a viscosity greater than I on the Gardner-Holdt scale is obtained.

9. The process according to claim 8 in which 1 mole of each of reactants (b) and (d) and two moles of reactant (c) for each mole of reactant (a) are used in forming the polymer, and the reaction between said polymer and epichlorohydrin is continued until a viscosity greater than I on the Gardner-Holdt scale is obtained.

10. The process according to claim 9 in which reactant (a) is 1-(carboxypentyl), 4-carboxypyrrolidone, reactant (b) is caprolactam, and reactant (d) is diethylene triamine.

11. An improved wet strength paper comprising a web of paper-making fibers and from about 0.15% to about 3%, based on the weight of dry fibers, of a cationic thermosetting resin prepared by reacting:

(a) a heterocyclic dibasic carboxylic acid of the formula

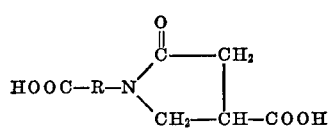

where R is an alkylene radical containing from 1 to 10 carbon atoms or an arylene radical, and for each mole of said dicarboxylic acid, (b) from about 0 to 5 moles of an amino carbonyl compound which is an amino acid of the formula

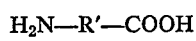

or a lactam of the formula

where R' is an alkylene radical containing from 1 to 10 carbon atoms or an arylene radical, and R" is an alkylene radical containing from 3 to 10 carbon atoms;

(c) from about 1 to 4 moles of an amine which is a diamine of the formula

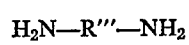

or a polyalkylene polyamine of the formula

where R''' and R$^{iv}$ are alkylene groups containing from 2 to 6 carbon atoms, and $n$ is an integer from 1 to 5; and (d) from about 1 to 3 moles of epichlorohydrin, to form a water-soluble polyamine polyamide polymer, and further reacting said polymer with epichlorohydrin.

12. An improved wet strength paper according to claim 11, in which the mole ratio of the further reacted epichlorohydrin to secondary amine groups in said polymer is from about 0.5 to 1 to about 1.8 to 1.

13. An improved wet strength paper according to claim 12 in which in preparing the cationic thermosetting resin one mole of each of reactants (b) and (d) and two moles of reactant (c) for each mol of reactant (a) are used, and sufficient additional epichlorohydrin is used to convert all of the secondary amino groups of said polymer to tertiary amino groups.

14. An improved wet strength paper according to claim 13 wherein in forming said cationic thermosetting resin said reactant (a) is 1-(carboxypentyl), 4-carboxy-pyrrolidone, reactant (b) is caprolactam, and reactant (c) is diethylene triamine.

References Cited
UNITED STATES PATENTS

| | | | |
|---|---|---|---|
| 3,250,664 | 5/1966 | Conte et al. | 162—164 |
| 3,654,954 | 2/1972 | Terada et al. | 162—164 X |
| 3,609,126 | 9/1971 | Yokohama et al. | 162—164 X |
| 3,395,130 | 7/1968 | McDowell et al. | 162—164 X |
| 3,382,096 | 5/1968 | Boardman | 260—78.5 C X |
| 3,224,986 | 12/1965 | Butler et al. | 260—78.5 C X |
| 2,926,116 | 2/1960 | Keim | 162—164 |
| 2,926,154 | 2/1960 | Keim | 162—164 X |
| 3,239,491 | 3/1966 | Tsou et al. | 162—164 X |
| 3,240,721 | 3/1966 | Fordyce | 162—164 X |

S. LEON BASHORE, Primary Examiner

K. M. SCHOR, Assistant Examiner

U.S. Cl. X.R.

162—158; 260—78 SC

UNITED STATES PATENT OFFICE
CERTIFICATE OF CORRECTION

Patent No. 3,761,350          Dated September 25, 1973

Inventor(s)   Francis S. Munjat and Sin-Ho Kim

It is certified that error appears in the above-identified patent and that said Letters Patent are hereby corrected as shown below:

Column 1, line 14, the formula: 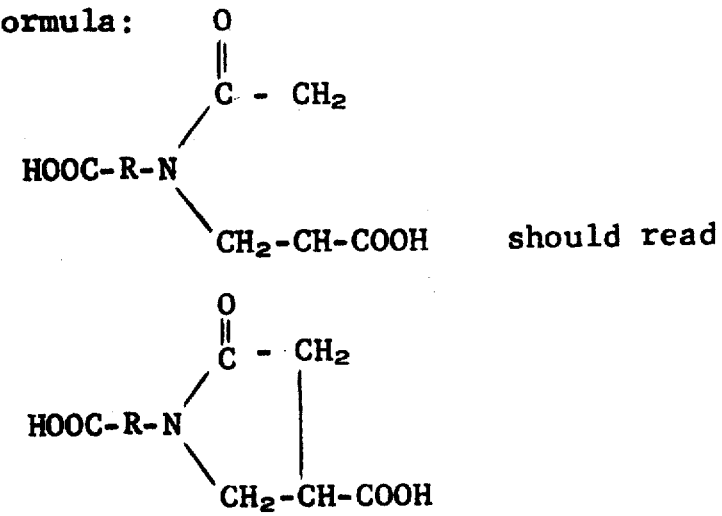 should read

Column 9, line 1, "amino" should read -- amine --;

Column 9, Table I, line 28, "25.3" should read -- 35.3 --.

Signed and sealed this 7th day of January 1975.

(SEAL)
Attest:

McCOY M. GIBSON JR.
Attesting Officer

C. MARSHALL DANN
Commissioner of Patents